United States Patent [19]
Patton et al.

[11] 3,863,203
[45] Jan. 28, 1975

[54] METHOD AND APPARATUS FOR CONTROLLING THE DATA RATE OF A DOWNHOLE ACOUSTIC TRANSMITTER IN A LOGGING-WHILE-DRILLING SYSTEM

[75] Inventors: Bobbie J. Patton, Dallas; James H. Sexton; John W. Harrell, both of Duncanville, all of Tex.

[73] Assignee: Mobil Oil Corporation, New York, N.Y.

[22] Filed: May 4, 1973

[21] Appl. No.: 357,315

Related U.S. Application Data

[63] Continuation-in-part of Ser. No. 272,838, July 18, 1972, Pat. No. 3,800,277.

[52] U.S. Cl.... 340/18 LD, 340/18 NC, 340/18 CM, 175/40
[51] Int. Cl................................................ G01v 1/40
[58] Field of Search ...... 340/18 NC, 18 LD, 18 CM, 340/18 P; 181/.5 TS; 166/113; 175/40, 48

[56] References Cited
UNITED STATES PATENTS

| | | | |
|---|---|---|---|
| 3,233,674 | 2/1966 | Leutwyler | 340/18 NC |
| 3,309,656 | 3/1967 | Godbey | 340/18 LD |
| 3,764,970 | 10/1973 | Manning | 340/18 LD |

*Primary Examiner*—Maynard R. Wilbur
*Assistant Examiner*—N. Moskowitz
*Attorney, Agent, or Firm*—C. A. Huggett; George W. Hager, Jr.

[57] ABSTRACT

A logging-while-drilling system employs a downhole acoustic transmitter for telemetering information derived from measured downhole conditions to the surface of the earth. The data rate at which such information is transmitted is controlled from the surface of the earth by varying the operating parameters of the system. The value of a first operating parameter is detected downhole and compared with a pair of reference signals. The period of time the first operating parameter is maintained within the range defined by the pair of reference signals determines the initial data rate setting of the acoustic transmitter. The value of a second operating parameter is detected downhole and compared with a reference signal. Whenever the second operating parameter is controlled to exceed (in either a positive or a negative direction) the reference value, the data rate is shifted to a new setting.

9 Claims, 8 Drawing Figures

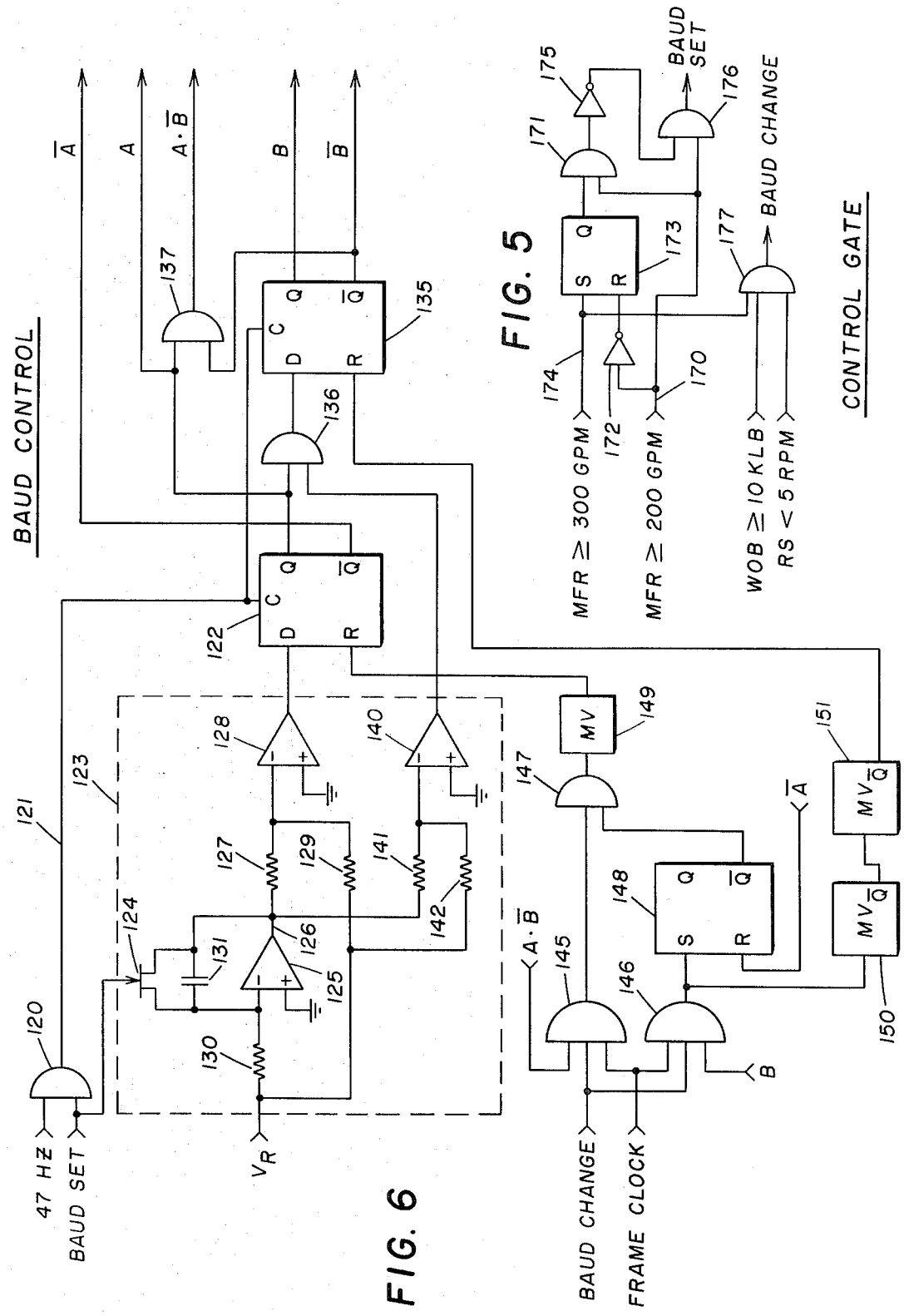

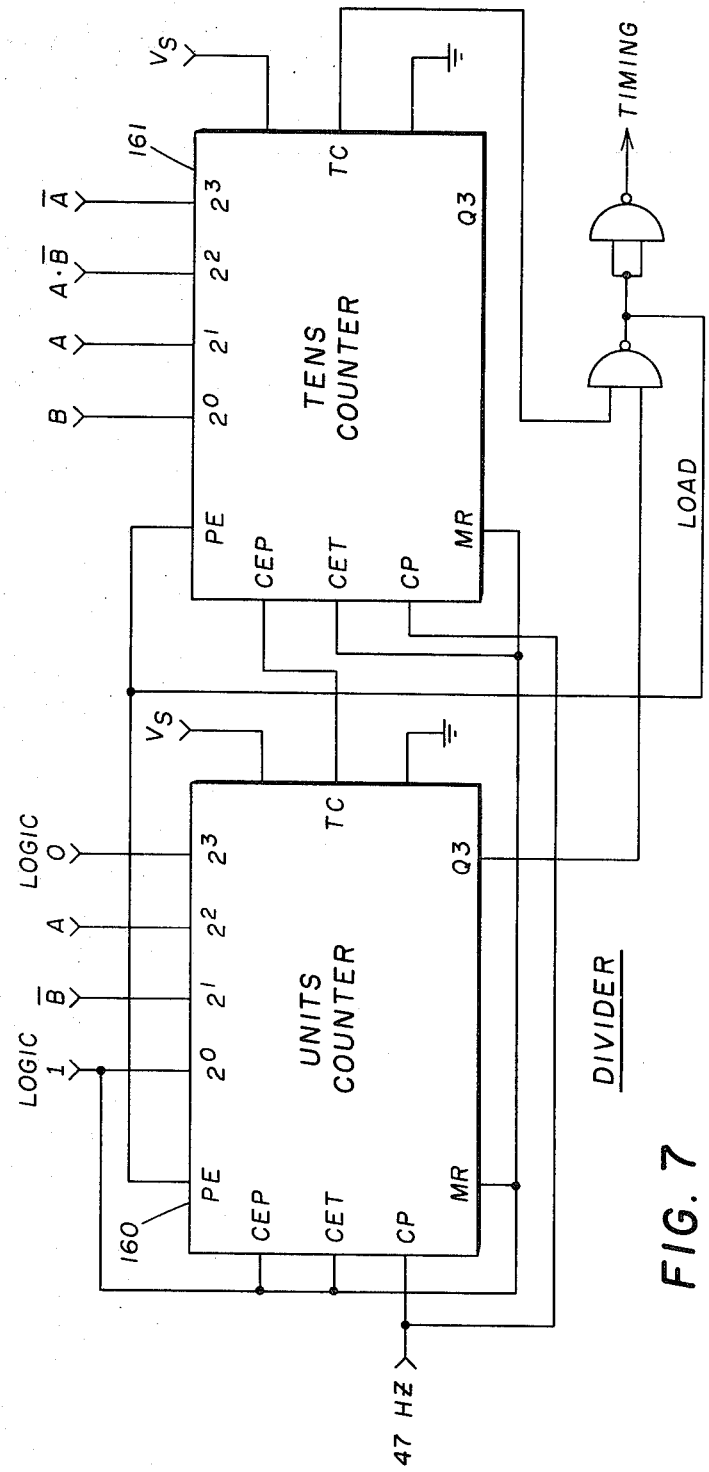

METHOD AND APPARATUS FOR CONTROLLING THE DATA RATE OF A DOWNHOLE ACOUSTIC TRANSMITTER IN A LOGGING-WHILE-DRILLING SYSTEM

This application is a continuation-in-part of U.S. application Ser. No. 272,838, filed July 18, 1972, now Pat. No. 3,800,277.

BACKGROUND OF THE INVENTION

This invention relates generally to logging while drilling wherein control of downhole operations which a borehole are effected from the surface of the earth. More particularly, information is telemetered to a downhole tool by means of communication channels afforded by the various operating parameters of the logging-while-drilling system.

In one such logging-while-drilling system, the sensing apparatus located within the borehole transmits the logging measurements by means of an acoustic wave passing upward through the drill string. Such a system is disclosed in U.S. Pat. No. 2,810,546 to B. G. Eaton, et al. In another such logging-while-drilling system, the drilling liquid within the borehole is utilized as the transmission medium for the information-bearing acoustic waves. An example of such a system is disclosed in U.S. Pat. No. 3,309,656 to John K. Godbey. In the Godbey system, drilling liquid is continuously circulated downward through the drill string and drill bit and upward through the annulus provided by the drill string and the borehole wall, primarily for the purpose of removing cuttings from the borehole. An acoustic transmitter located downhole continuously interrupts the flow of the drilling liquid, thereby generating an acoustic signal in the drilling liquid. The acoustic signal is modulated with information measured downhole by sensing apparatus, and the modulated acoustic signal is telemetered uphole through the drilling liquid to suitable recording equipment.

In copending U.S. application Ser. No. 340,789, filed Mar. 13, 1973, entitled DOWNHOLE DATA GENERATOR FOR LOGGING-WHILE-DRILLING SYSTEM, by Harrell, et al, there is disclosed and claimed a logging-while-drilling system in which various downhole timing pulses control the data rate of the transmitted acoustic signal. These timing pulses are derived from a single reference clock source. Serial frequency dividers divide the reference clock down to the desired frequencies for the required timing pulses. One such timing pulse determines the data rate of the transmitted acoustic signal. The frequency divider providing for this timing pulse is programmable by means of an adjustable manual control or knob. By means of such manual control, the frequency divider, which produces the timing pulses, is adjusted to provide for changes in the data rate of the transmitted acoustic signal.

In another copending U.S. application Ser. No. 272,838, filed July 18, 1972, entitled METHOD AND APPARATUS FOR SURFACE-TO-DOWNHOLE COMMUNICATION by Patton, et al, there is disclosed and claimed a logging-while-drilling system in which communication with the downhole tool is accomplished by controlling from the surface of the earth the conditions in various communication channels such as weight on bit, mud flowrate, and rotary speed. These conditions are sensed downhole and changes in such conditions detected to effect control of downhole operations.

SUMMARY OF THE INVENTION

In accordance with one aspect of the invention, the rate at which a downhole acoustic transmitter of a logging-while-drilling system transfers data derived from measured downhole conditions to the surface of the earth is controlled from the surface of the earth. By varying from the surface of the earth at least one of the operating parameters of the logging-while-drilling system, a downhole control signal is produced. The data rate of the transmitted acoustic signal is set in response to the control signal.

In another aspect, a time integral of the control signal is produced. This time integral is compared with a pluarlity of reference signals, and a plurality of comparison signals are produced. These comparison signals are selectively combined to produce timing pulses which are utilized to set the data rate of the acoustic transmitter. More particularly, the comparison signals are applied to a programmable frequency divider to program the division of a source of clock pulses into the timing pulses required to set the desired data rate of the acoustic transmitter.

In a further aspect, a second control signal is produced in response to the variation of a second operating parameter. This second control signal is utilized to change the state of at least one of the comparison signals, whereby the frequency divider is reprogrammed to produce the timing pulses required for a new data rate setting of the acoustic transmitter.

BRIEF DESCRIPTION OF THE DRAWINGS

FIG. 5 is a detailed electrical schematic of the components of the control gate section of FIG. 4.

FIG. 6 is a detailed electrical schematic of the components of the baud control section of FIG. 4.

FIG. 7 is a detailed electrical schematic of the frequency divider section of FIG. 3.

FIG. 8 is a truth table illustrating the input signals to the frequency divider section of FIG. 7.

DESCRIPTION OF THE PREFERRED EMBODIMENT

In accordance with the present invention a communication control system is provided for controlling the data rate of the transmitted acoustic signal in a logging-while-drilling system. More particularly, information is telemetered downhole by means of the available surface-to-downhole communication channels. Such information is utilized downhole to provide the control signals necessary for automatically setting or changing the data rate of the acoustic signal.

Prior to describing how these downhole control signals are utilized to set or change the data rate of the acoustic signal in accordance with the present invention, a brief description of a logging-while-drilling system which generates such an acoustic signal will be given in conjunction with FIGS. 1–3. The present invention will thereafter be described in detail in conjunction with FIGS. 4–8.

Figure 1:
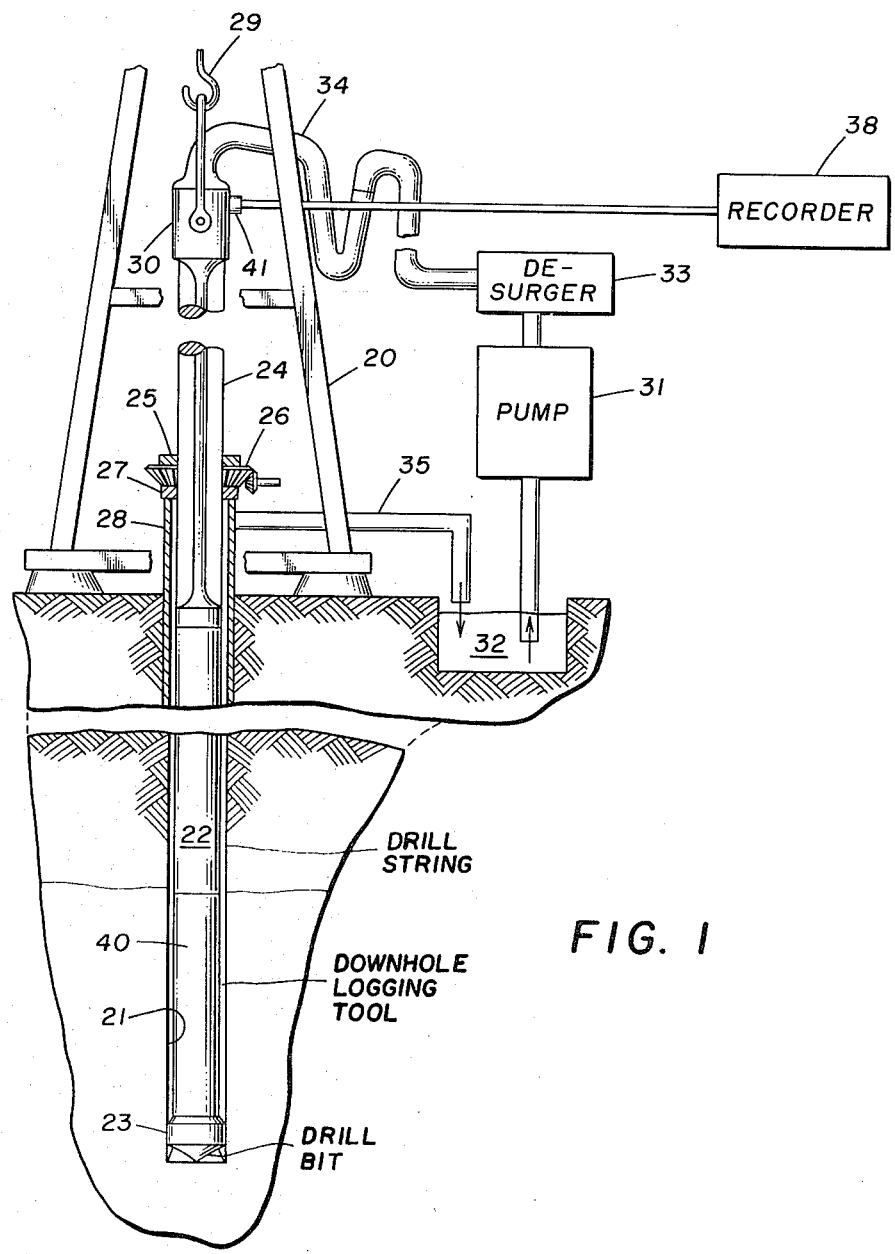
FIG. 1 illustrates a well drilling system adapted to simultaneously drill and log a well.

In FIG. 1 there is shown a derrick 20 located over a well 21 being drilled in the earth by rotary drilling. A drill string 22 is suspended within the well 21 from the derrick 20. The drill string 22 includes a plurality of sections of drill pipe with one or more drill collars and a drill bit 23 secured at its lower end and a kelly 24 secured at its upper end. Kelly 24 extends through and is rotatably engaged by rotary table 25. A suitable prime mover (not shown) drives a member 26 which rotatably engages the rotary table 25, thereby rotating the drill string 22 within the well 21. The member 26 is superimposed directly above a wellhead 27. The wellhead 27 is secured to a casing 28 which is cemented into position a short distance into the well 21. A hook 29 is connected to the kelly 24 through a rotary swivel 30. Hook 29 is attached to a traveling block (not shown) which in turn is suspended by a suitable cable (also not shown). The rotary swivel permits rotation of the drill string relative to the hook and traveling block.

The swivel 30 also forms a fluid connection between a source of drilling mud and the drill string 22. A pump 31 transfers the drilling mud from a pit 32 in the earth through a desurger 33, which is adapted to suppress noise in the drilling fluid, and a flexible hose 34 into the swivel 30. The drilling mud then flows downwardly into the drill string 22 and exists through openings in the drill bit 23 into the well 21. The drilling mud then circulates upwardly from the drill bit 23 carrying formation cuttings through the annulus between the drill string 22 and the well 21 to the surface of the earth. A pipe 35 is connected to the casing 28 for returning the drilling mud from the well 21 to the pit 32.

Located within the drill string 22 near the drill bit is a downhole logging tool 40 which includes one or more transducers for measuring downhole conditions and an acoustic transmitter which produces an acoustic signal in the drilling mud representative of the downhole conditions. This acoustic signal is telemetered uphole thorugh the drilling mud where it is received by one or more transducers 41 mounted on the swivel 30. The signals from transducers 41 are applied to a recording system 38 which provides readout functions representative of the measured downhole conditions.

Figure 2:
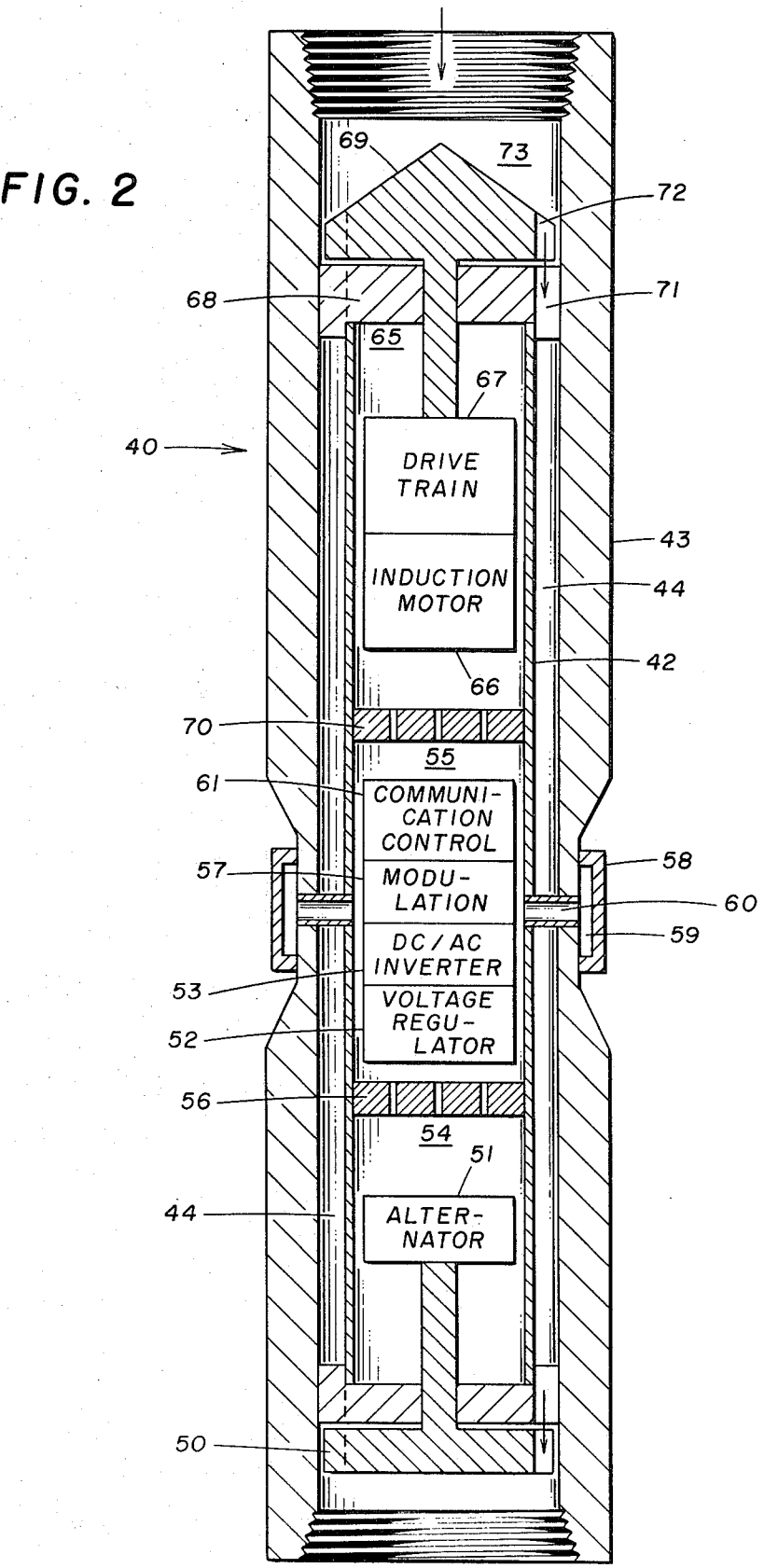
FIG. 2 is a cross-sectional view of a borehole logging tool utilized in the logging-while-drilling system of FIG. 1.

In FIG. 2 there is illustrated in detail the downhole logging tool 40. It is formed by an inner housing 42 located within an outer housing 43. The inner and outer housings define an annulus 44 through which drilling mud passes during drilling operations. The upper and lower ends of the outer housing 43 are threaded for connection into a drill string. Within the inner housing 42 are contained the operating parts of the logging-while-drilling system, the power source, the modulation section, the acoustic transmitter, and the communication control section.

The power requirements for the acoustic transmitter are derived from a power source comprising a mud turbine 50, an alternator 51, a voltage regulator 52, and a DC/AC inverter 53. The mud turbine 50 is located immediately below a lower section 54, and the alternator 51 is located within the lower section 54. During the drilling operations, drilling mud is continuously circulated through the drill bit by a positive displacement pump located aboveground, primarily to remove cuttings from the hole. There is substantial hydraulic power in this drilling mud. In the logging-while-drilling system, this drilling mud is passed through the annulus 44, and the hydraulic power is converted to mechanical power by means of the mud turbine 50. Mud turbine 50 drives the alternator 51 to convert the mechanical power to AC electrical power. Alternator 51 is preferably a three-phase, six-pole alternator. Located within a middle section 55 is the voltage regulator 52 which rectifies and filters the three-phase, AC power output from the alternator 51 and provides a regulated DC power output. The DC/AC inverter 53 converts the DC power into suitable AC power for starting and operating the acoustic transmitter. The middle section 55 is sealed from the lower section 54 by means of bulkhead 56. The electrical connection from the alternator 51 to the voltage regulator 52 passes through this bulkhead.

Located near and in communication with middle section 55 are the various types of transducers used to convert such downhole conditions as fluid pressures and temperatures, drilling conditions adn parameters, and formation characters into analog electrical signals. These analog signals are applied to a modulation section 57 for conversion into digital signals for use in modulating the acoustic transmitter. A collar 58 surrounding the outer housing 43 provides a compartment 59 within which the transducers may be located. The transducers communicate with the modulation section 57 by means of a channel 60 leading from compartment 59 into the middle section 55.

Also located within the middle section 55 is a communication control section 61 which embodies the present invention and which will be described in detail hereinafter.

Located within an upper section 65 is an induction motor 66 and a drive train 67. An acoustic generator 73 comprising a fixed stator 68 and a rotary valve 69 is located immediately above the upper section 65. These four components, induction motor 66, drive train 67, stator 68, and rotary valve 69, comprise the acoustic transmitter. Rotary motion of the rotary valve 69 is initiated and maintained by the induction motor 66 which is connected rigidly to the rotating valve through the drive train 67. The induction motor 66 is electrically connected to the DC/AC inverter 53 through a bulkhead 70 which seals the middle section 55 from the upper section 65. The stator 68 and the rotary valve 69 have complementing slots 71 and 72. The rotor is in an open position when the slot 72 is rotated to a position which is in communication with the slot 71 of the stator 68. As the valve 69 is rotated, it continuously interrupts the flow of mud, thereby generating the acoustic signal which travels upward through the mud column to the surface of the earth.

An example of a borehole logging tool utilizing such a power source and acoustic transmitter discussed so far in relationship to FIGS. 1 and 2 is set forth in U.S. Pat. No. 3,309,656 to John K. Godbey. For a more detailed description of the mechanical and electrical features of such a borehole logging tool, reference may be had to the aforementioned patent to Godbey.

Figure 3:
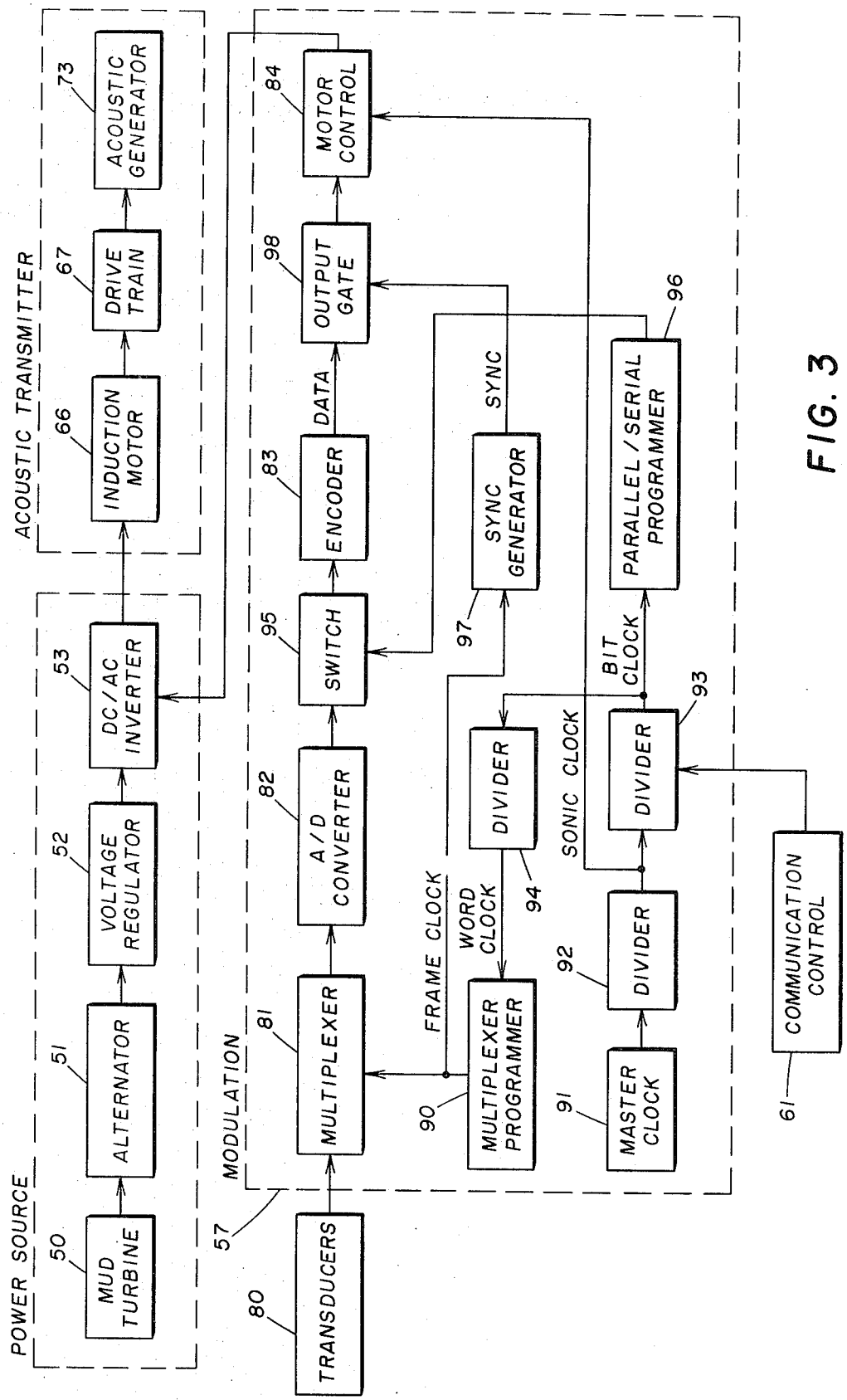
FIG. 3 is a flow diagram illustrating the components housed within the borehole logging tool of FIG. 2.

In FIG. 3 there is illustrated in electrical flow diagram the details of the operation of the modulation section 57 in converting the measurements of transducers 80 into digital signals for use in modulating the acoustic transmitter. Measurements from such transducers are applied in analog form to the modulation section 57 where they are multiplexed by multiplexers 81 and are coded into binary digital words by an A/D converter 82. Each digital word is converted into serial binary bits by an encoder 83 and applied to motor control 84 which in turn regulates the frequency of the AC power applied from the DC/AC inverter 53 to the induction motor 66, consequently varying the speed of the induction motor 66.

A particularly suitable modulation section including such a multiplexer, A/D converter, encoder, and motor control is illustrated and described in detail in copending U.S. Pat. application Ser. No. 340,789, filed Mar. 13, 1973, entitled DOWNHOLE DATA GENERATOR FOR LOGGING-WHILE-DRILLING SYSTEM by Harrell, Patton, and Ballard; and the disclosure thereof is incorporated herein by reference. However, a brief understanding of such a modulation section is necessary in order that the operation of the communication control section 61, which embodies the present invention, may be fully understood.

Transducers 80 generate analog signals representing the condition of the formations surrounding the well and/or conditions of the drilling operation. These analog signals are applied to a multiplexer 81 which operates under control of a multiplexer programmer 90. The programmer 90 is driven by word clock pulses derived from a master clock 91 and serial frequency dividers 92, 93, and 94.

The multiplexer 81 sequentially applies each of the analog signals to the A/D converter 82. The A/D converter 82 converts the analog signals into digital words made up of parallel bits.

The switch 95 sequentially switches each of the parallel bits to a serial-by-bit signal. Timing pulses from divider 93 are applied to a parallel-to-serial programmer 96. The programmer 96 responds to the timing pulses to program the switch 95 to sequentially apply each of the parallel bits in serial manner to the encoder 83. Encoder 83 produces a data signal upon the occurrence of a logic "1" bit in the serial-by-bit signal. This data signal, as gated by output gate 98, causes the motor control 84 to momentarily change the speed of rotation of the induction motor 66. This reverses the phase of the acoustic signal in motor 66. This reverses the phase of the acoustic signal in accordance with each logic "1" bit in the serial-by-bit signal from the switch 95. When all of the analog voltages have been sampled, the last stage of the programmer 90 produces a frame clock pulse signifying the completion of the conversion of all analog voltages, that is, the completion of one frame. The system transmits repetitive frames of sampled voltages.

The sync generator 97, in response to the frame clock pulse produced during the last stage of the multiplexer programmer 90, produces a sync signal. This sync signal inhibits the output gate 98 from passing the data signal from the encoder 83 to the motor control 84 during the period of this last stage.

As further illustrated and described in the aforementioned copending U.S. Pat. application Ser. No. 340,789, the frequency division of the sonic clock by the synchronous frequency divider 93 to change the timing signal to the parallel-to-serial converter 96 is variably programmable by means of a manual setting such as a knob. By turning the knob, a change is made in the timing signal which effects a corresponding change in the data rate of the transmitted acoustic signal.

As previously discussed, it is the specific feature of the present invention that the available surface-to-downhole communication channels be utilized to effect changes in the data rate of the signal from the downhole acoustic transmitter as the signal-to-noise ratio of the signal decreases with increasng depth of the tool. Accordingly, the present invention provides for the remote control from the surface of the earth of this data rate without necessitating a stoppage of the logging-while-drilling operation to effect a manual change. The operation of the downhole tool in detecting the information transmitted downhole from the surface and in changing the data rate in response to this information will now be described in detail in conjunction with FIGS. 4–8.

Figure 4:
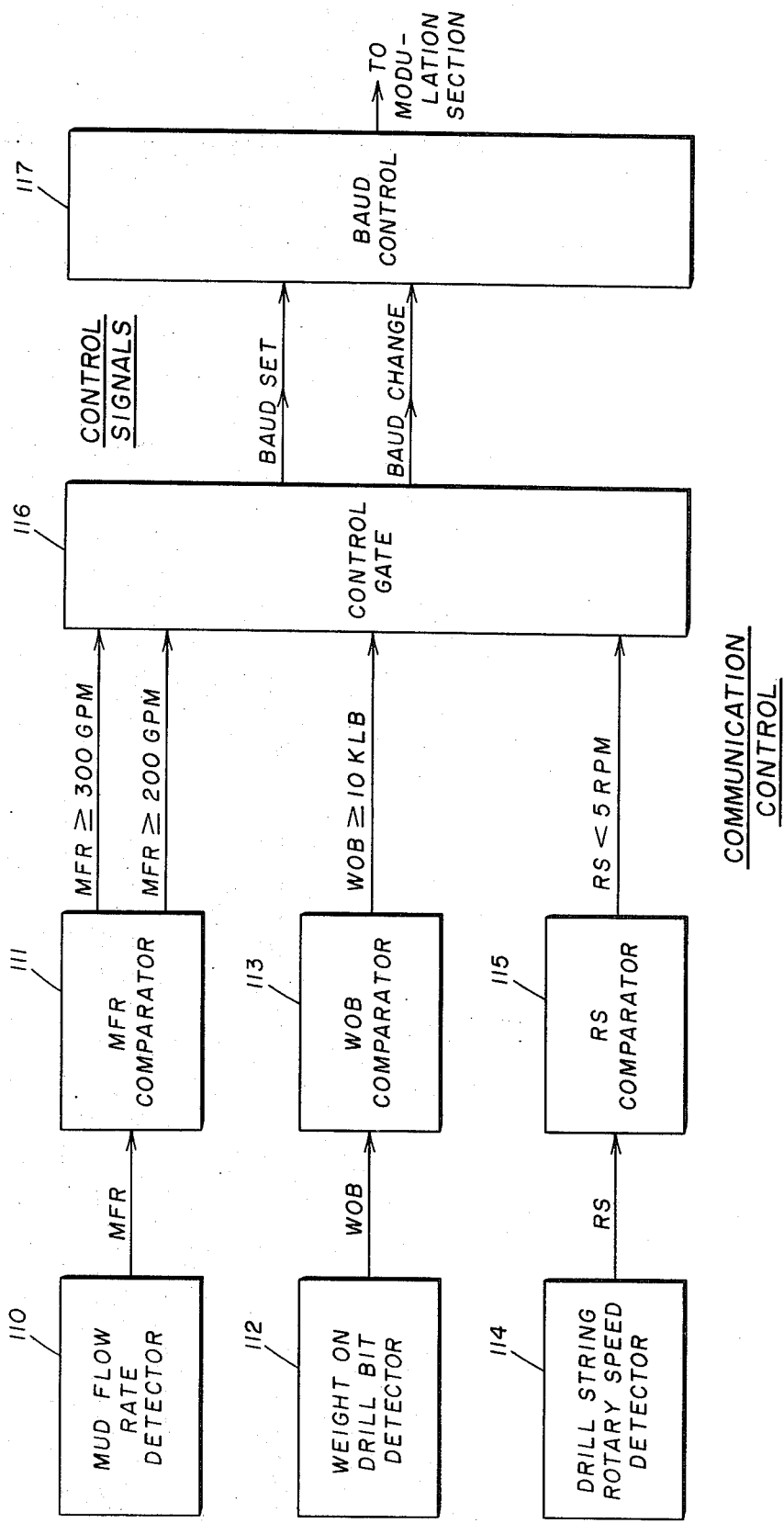
FIG. 4 is a flow diagram illustrating the communication control system of FIG. 3.

In FIG. 4, there is illustrated a block diagram of the communication control unit 61 of the present invention comprising a mud flow rate detector 110 and a mud flow rate comparator 111, a weight-on-drill-bit detector 112 and a weight-on-drill-bit comparator 113, a drill string rotary speed detector 114 and a drill string rotary speed comparator 115, a control gate 116, and a baud control unit 117.

The flow rate of the drilling mud through the drill string is controlled from the pump 31 on the surface of the earth. This flow rate may be utilized as one of the communication channels from the surface of the earth to the downhole equipment. The mud flow rate detector 110 provides an electrical signal MFR which is proportional to the flow rate of the drilling mud, and such MFR signal is applied to mud flow rate comparator 111. Mud flow rate comparator 111 provides, for example, two output signals. The first output signal is present whenever the mud flow rate is equal to or exceeds the rate of 200 gallons per minute. The second output signal is present whenever the mud flow rate is equal to or exceeds a flow rate of 300 gallons per minute.

A weight-on-drill-bit detector 112 provides a WOB signal which is proportional to the weight on the drill bit. This weight is controllable by means of the hook 29 and its associated traveling block (not shown). The WOB signal is applied to weight-on-drill-bit comparator 113 which provides an output signal when the weight on the drill bit is equal to or greater than 10,000 pounds.

The drill string rotary speed detector 114 provides an RS signal which is porportional to the rotary speed of the drill string. The rotary speed of the drill string is directly controllable by means of the prime mover which drives the member 26 which in turn rotatably engages the rotary table 25 for rotating the drill string 22. The RS signal is applied to drill string rotary speed comparator 115 which, for example, may provide an output signal whenever the rotary speed is less than five revolutions per minute.

Each of the output signals from the three comparators 111, 113, and 115 is applied to a control gate 116. Control gate 116 selectively combines these signals to provide for control signals which will be utilized in the baud control 117 to produce the timing pulses that control the data rate of the transmitted acoustic signal.

For further details as to the configuration of a suitable mud flow rate detector 110 and comparator 111, weight-on-bit detector 112 and comparator 113, drill string rotary speed detector 114 and comparator 115, reference may be made to copending U.S. Pat. application Ser. No. 272,838 entitled METHOD AND APPARATUS FOR SURFACE-TO-DOWNHOLE COMMUNICATION filed July 18, 1972, by Patton, Sexton, and Harrell.

To aid in the understanding of the following description of the control gate 116 (FIG. 5), the baud control 117 (FIG. 6) and the synchronous frequency divider 93 (FIG. 7) in the control of the data rate of the acoustic signal transmission, a definition of the unit of data rate is desirable. The unit of data rate is the baud (bits/sec). This data rate, or baud, is inversely related to the byte length of the acoustic signal. In a binary-coded transmission system, such as described herein, the byte length is the number of acoustic cycles required to transmit one bit of information.

Referring now to FIG. 5, the operation of the control gate 116 in providing the baud set and baud change signals will be described. The initial data rate is set by controlling the mud flow rate of the logging-while-drilling system. When the mud flow rate is less than 200 gallons per minute, line 170 is at a logic "0" level. Line 170 is applied directly to AND gate 171 and is applied by way of inverter 172 to the reset terminal R of flip-flop 173. Line 174 is applied to the SET input terminal S of the flip-flop 173. When the mud flow rate is less than 200 gallons per minute, a logic "1" signal is applied to the reset terminal R of flip-flop 173. This resets the Q output to a logic "0" state. When the mud flow rate then exceeds 200 gallons per minute, a logic "0" signal is applied to the reset terminal R, thereby removing the reset. When the mud flow rate exceeds 300 gallons per minute, line 174 applies a logic "1" signal to the S input terminal. The Q output terminal of flip-flop 173 is now set to a logic "1" by the leading edge of the logic "1" input to the S terminal. This Q output terminal of flip-flop 173 is applied to AND gate 171. When the mud flow rate exceeds both 200 gallons per minute and 300 gallons per minute, both inputs to AND gate 171 are at a logic "1" level and AND gate 171 provides a logic "1" output. Further, gate 171 remains at a logic "1" output level so long as the mud flow rate, after initially exceeding 300 gallons per minute, remains above a 200-gallon-per-minute level. The flip-flop 173 which was set to a logic "1" state by the mud flow rate exceeding 300 gallons per minute is not reset to a logic "0" state until the mud flow rate drops below 200 gallons per minute. At this point, the signal on line 170 drops to a logic "0" state and is applied by way of inverter 172 as a logic "1" reset signal to the reset terminal R of flip-flop 173.

The baud set signal B is produced by combining the output of gate 171 with the MFR signal on line 170. Gate 171 is coupled by way of inverter 175 to one input of AND gate 176. The MFR signal on line 170 is applied to the other input of AND gate 176. The input to AND gate 166 on line 170 is a logic "1" level whenever the MFR signal is at a logic "1" level, indicating that the mud flow rate is greater than 200 gallons per minute. The other input to AND gate 176 is at a logic "1" level when the mud flow rate has not exceeded 300 gallons per minute. The baud set signal from AND gate 176 becomes a logic "1" whenever the mud flow rate equals or exceeds 200 gallons per minute and has not equaled or exceeded 300 gallons per minute since reaching 200 gallons per minute. Once the mud flow rate equals or exceeds 300 gallons per minute, the baud set signal becomes a logic "0" and remains at logic "0" until the mud flow rate is decreased to less than 200 gallons per minute and then again is increased to equal or exceed 300 gallons per minute.

The baud change signal is generated by the selective combination of the MFR signal on line 174, the WOB signal, and the RS signal. Baud change is at a logic "1" level whenever each of the three inputs to AND gate 177 is at a logic "1" level, indicating that the mud flow rate equals or exceeds 300 gallons per minute, that the weight on bit equals or exceeds 10,000 pounds, and that the rotary speed is less than 5 RPM.

These baud set and baud change signals are utilized by the baud control unit 117 of FIG. 6 to provide for a coded word having the digital output pulses A, $\bar{A}$, B, $\bar{B}$, and A·$\bar{B}$. An understanding of the utilization of the pulses A, $\bar{A}$, B, $\bar{B}$, and A·$\bar{B}$ by the frequency divider 93 (FIG. 7) will be helpful in the understanding of the detailed operation of the baud control unit 117 (FIG. 6). Reference is therefore now made to FIG. 7 which illustrates the pulses A, $\bar{A}$, B, $\bar{B}$, and A·$\bar{B}$ as being selectively connected to the count inputs of the units counter 160 and the tens counter 161 of the synchronous frequency divider 93. These pulses program the counters to divide the 47-hertz input clock into the timing pulses required to set the desired byte length of the acoustic signal transmission. For example, with an acoustic transmitter frequency of 23.5 hertz, a desirable initial byte length may be 8 periods of acoustic signal (0.34 sec). This corresponds to a data rate of 2.94 baud. To provide for this byte length, the parallel-to-serial converter 96 (FIG. 3) must be clocked by a timing pulse approximately every 0.34 second as illustrated in the truth table of FIG. 8. Such a timing pulse can be produced by programming the synchronous frequency divider to a division of 16. Such a division is accomplished when the baud control unit 117 produces $\bar{A}$ and $\bar{B}$ outputs of logic "1," the remaining baud control unit output pulses remaining at logic "0."

Similarly for a byte length of 16 acoustic periods, the 47-hertz input clock must be divided by 32 to provide for a timing pulse approximately every 0.68 second. As can be seen from the truth table, this operation requires the A, $\bar{B}$, and A·$\bar{B}$ signals to each be a logic "1" level, while the $\bar{A}$ and B signals are to be at a logic "0" level. Also, for a byte length of 32 acoustic periods, only the A and B signals are at a logic "1" level.

As can be noted in FIG. 7, the $2^0$ and $2^3$ count inputs to the units counter 160 are always tied to logic "1" and logic "0," respectively.

The baud setting and changing operation of the baud control 117 will now be described in detail in conjunction with FIG. 6. Upon the mud flow rate equaling or exceeding 200 gallons per minute, the baud set signal applied to one input of AND gate 120 becomes a logic "1," thereby permitting the 47-hertz clock at the other input to AND gate 120 to be applied by way of line 121 to the clock input of the flip-flops 122 and 135. The baud set signal is also connected to the voltage integrator 123. A logic "1" baud set signal is applied to the FET switch 124 which in turn sets the amplifier 125. Amplifier 125 therefore integrates the reference voltage $V_R$ during the period of time that the mud flow rate initially equals or exceeds 200 gallons per minute and remains less than 300 gallons per minute. FET switch resets amplifier 125 to zero whenever the logic "1" signal is removed from the baud set input. Consequently, the amplifier 125 output on line 126 is zero when the mud flow rate is less than 200 gallons per minute and is a smoothly increasing function from the moment the mud flow rate equals or exceeds 200 gallons per minute and remains less than 300 gallons per minute. The output of amplifier 125 is a negative function which is applied through resistor 127 to the negative input of amplifier 128. This negative input is held at a positive voltage by resistor 129 (which has a resistance equal to that of resistor 127) until such time as the voltage of amplifier 125 exceeds in a negative direction the value of the positive reference voltage $V_R$. At such time, the input to the amplifier 128 becomes negative and its output switches from a logic "0" state to a logic "1" state. The values of resistor 130 and capacitor 131 are selected to provide for an RC time period $\tau$. When the mud flow rate exceeds 200 gallons per minute, a logic "1" baud set signal is applied to FET switch 124 and the period $\tau$ begins to run. At the end of the $\tau$ period, the amplifier 125 provides the negative output required to trigger the amplifier 128 to the logic "1" state.

The output of amplifier 128 is applied to the D input of flip-flop 122. The Q output of flip-flop 122 goes to a logic "1" when the clock input C is set to a logic "1" while the D input is at logic "1." The Q output remains at a logic "1" until the C input goes to a logic "1" while the D input is at logic "0" or until there is a logic "1" applied to the reset input R.

Therefore, if the mud flow rate is increased from 200 to 300 gallons per minute in a period less than $\tau$, the output of amplifier 125 is not sufficient to trigger amplifier 128 and, consequently, the output of flip-flop 122 remains at a logic "0." This output of flip-flop 122 is the A output signal applied to the synchronous frequency divider 93.

Flip-flop 135 is identical in operation with flip-flop 122. Consequently, the operation of AND gate 136 is such that when the Q output of flip-flop 122 is logic "0," a logic "0" is applied to the D input of flip-flop 135, thereby settting its Q output, or B output signal, to logic "0" upon the occurrence of a logic "1" on the clock input C. In this situation, both complementary outputs $\overline{Q}$, output signals $\overline{A}$ and $\overline{B}$ of flip-flops 122 and 135, respectively, are logic "1." By operation of gate 137, the A·$\overline{B}$ output signal is logic "0."

Therefore, under the circumstances when the mud flow rate is increased from 200 to 300 gallons per minute in less than the period $\tau$, the output signals A, $\overline{A}$, B, $\overline{B}$, and A·$\overline{B}$ are of the logic states required by the truth table in FIG. 8 to program the synchronous frequency divider 93 to divide by 16 and thereby provide the required bit clock pulse for an initial byte length setting of 8 acoustic periods.

Included also in the voltage integrator 123 is the amplifier 140 and resistors 141 and 142, resistor 141 having twice the resistance of resistor 142. Now, should the initial mud flow rate be maintained between 200 and 300 gallons per minute for a period greater than $\tau$ but less than a period of 2$\tau$, the A output goes to a logic "1" as previously described, but the B output remains at logic "0" due to the operation of amplifier 140 applying a logic "0" signal to AND gate 136. AND gate 136 therefore continues to apply a logic "0" to the D input of flip-flop 135 even though the A output has changed states. Consequently, the B output remains at logic "0." The $\overline{B}$ output therefore also remains at logic "1" but the $\overline{A}$ output now is a logic "0" while the A·$\overline{B}$ is now logic "1." As can be noted in the truth table of FIG. 8, these logic states represent a division of 32 by the synchronous frequency divider 93 to thereby provide for a byte length setting of 16 acoustic periods.

In like manner with the above operations, should the initial mud flow rate be maintained between 200 and 300 gallons per minute for a period greater than 2$\tau$, the output signals A, $\overline{A}$, B, $\overline{B}$, and A·$\overline{B}$ are of the logic states shown in the truth table of FIG. 8 for a division of 64 and a byte length setting of 32 acoustic periods.

The byte length setting has been described for one embodiment wherein resistors 127 and 129 are of equal value and wherein resistor 141 is twice the value of resistor 142. Other values and ratios may be utilized if desirable to control the byte length setting utilizing different time periods for the baud set signal. The following table illustrates the general relationships:

| BYTE LENGTH (PERIODS) | TIME PERIOD FOR BAUD SET SIGNAL |
| --- | --- |
| 8 | <(R127/R129)$\tau$ |
| 16 | >(R127/R129)$\tau$ and <(R141/R142)$\tau$ |
| 32 | >(R141/R142)$\tau$ |

After having set the initial byte length, it may be desirable to change the byte length as changes occur in the signal-to-noise ratio of the transmitted acoustic signal. This may be accomplished by initiating from the surface of the earth changes in those surface-to-downhole communication channels which activate the baud change signal in the downhole communication control unit 61. This baud change signal is produced when the weight on the drill bit exceeds 10,000 pounds, the mud flow rate exceeds 300 gallons per minute, and the rotary speed of the drill string is less than 5 revolutions per minute. It should be noted at this point that the baud change signal can only be utilized by the baud control unit 117 to change the byte length of the transmitted acoustic signal to the next lower byte length. This will be made more clear in the following discussion.

The baud change signal, along with the frame clock signal from the modulation section 57, is applied as inputs to AND gates 145 and 146. For an initial baud setting of 8 acoustic periods, the A·$\overline{B}$ signal applied to AND gate 145 and the B signal applied to AND gate 146 are both at logic "0." In this event, AND gates 145 and 146 do not respond to the baud change signal, their outputs remaining at logic "0." Consequently, no change in byte length occurs.

For an initial byte length setting of 16 acoustic periods, the A·$\overline{B}$ signal is at logic "1," thereby permitting the output of AND gate 145 to go to logic "1" upon the presence of a baud change signal and a frame clock signal. This logic "1" output of AND gate 145 is applied to AND gate 147 along with the logic "1" $\overline{Q}$ output of flip-flop 148. The $\overline{Q}$ output of flip-flop 148 is logic "1" because at some previous time the $\overline{A}$ output has been at logic "1" and reset the flip-flop.

With both inputs at logic "1," AND gate 147 triggers the monostable multivibrator 149 to reset the flip-flop 122. With flip-flop 122 reset, the A, B, and A·$\overline{B}$ outputs will be logic "0" and the $\overline{A}$ and $\overline{B}$ outputs will be logic "1." As has been noted previously, these are the output conditions of the baud control unit 117 which represent a byte length of 8 acoustic periods.

For an initial byte length setting of 32 acoustic periods, the B output applied to AND gate 146 is at logic "1." In this situation, AND gate 146 provides a logic "1" signal to the S input of flip-flop 148 to set the $\overline{Q}$ output to a logic "0," thus disabling AND gate 147. Consequently, the reset signal is removed from flip-flop 122. Also, the logic "1" output of AND gate 146 triggers monostable multivibrator 150 which is positive-edge triggered. During the time period of multivibrator 150, its $\overline{Q}$ output applies a logic "0" to the trigger input of multivibrator 151. At the end of the time period of multivibrator 150, its $\overline{Q}$ output applies a logic "1" signal to multivibrator 151. Multivibrator 151 is then triggered to provide a drive pulse for the reset input of flip-flop 135. Flip-flop 135 is, therefore, reset at the end of the time delay provided by multivibrator 150 after the output of AND gate 146 goes to logic "1." The A and $\overline{B}$ outputs of flip-flops 122 and 135, respectively, are now set to logic "1," thus setting the byte length to 16 acoustic periods. At this time, the output of AND gate 145 will be set to logic "1" since the A·$\overline{B}$ output is at logic "1." Since the A·$\overline{B}$ output is now at logic "1," the output of AND gate 145 will go to logic "1" during the period of the next frame clock pulse provided the time delay period of multivibrator 150 is less than the width of the frame clock pulse. If this is true, the triggering of multivibrator 149 must be prevented as it would further reduce the byte length from 16 to 8 acoustic periods. Such a triggering of multivibrator 149 is prevented by AND gate 147 being disabled by the logic "0" pulse from the $\overline{Q}$ output of flip-flop 148 at this time, as discussed above.

In summarizing the byte length control, we can note that two functions are served. First, the initial byte length is set by raising the mud flow rate above 200 gallons per minute and maintaining it between 200 and 300 gallons per minute for a given period of time, the length of the period determining the actual byte length setting. Second, the byte length setting may be changed to a shorter byte length by initiating from the surface of the earth those drilling conditions which generate the baud change function, such as, weight on bit greater than 10,000 pounds, mud flow rate greater than 300 gallons per minute, and drill string rotary speed less than 5 revolutions per minute.

While the specific circuits of FIGS. 5–7 illustrate the operation of changing the initial byte length setting to the next sequential lower byte length, any sequence of byte length settings may be programmed into the programmable frequency divider by appropriate circuit design. In accordance with the specific embodiment illustrated in FIGS. 5–7, however, the following sets forth specific types and values of circuit components which may be utilized:

| Reference Designation | Description |
| --- | --- |
| FET switch 124 | 2N4857 (Texas Instruments) |
| Flip-flops 122, 135, 148, and 173 | SN7474 (Texas Instruments) |
| Monostable multivibrators 149–151 | SN74121 (Texas Instruments) |
| Operational amplifier 125 | MC1556G (Motorola) |

-Continued

| Reference Designation | Description |
| --- | --- |
| Operational amplifiers 128 and 140 | µA734 (Fairchild) |
| All gates | SN7400 Series (Texas Instruments) |
| All inverters | SN7400 Series (Texas Instruments) |
| Decade counters 160 and 161 | F9310 (Fairchild) |
| Voltage $V_c$ | +5 volts D.C. |

What is claimed is:

1. A method for controlling from the surface of the earth the rate at which a downhole acoustic transmitter of a logging-while-drilling system transfers data derived from measured downhole conditions to the surface of the earth, comprising:
   a. varying from the surface of the earth at least one of the operating parameters of the logging-while-drilling system,
   b. producing at a downhole location a control signal of a first state when said operating parameter is within a predetermined range and of a second state when said operating parameter is outside of said predetermined range, and
   c. setting the data rate of the transmitted acoustic signal in response to said control signal.

2. The method of claim 1 wherein the setting of the data rate comprises:
   a. generating a clock signal,
   b. dividing said clock signal in response to said control signal, thereby producing timing pulses with time periods representative of said control signal, and
   c. utilizing said timing pulses to set the number of acoustic periods for transmitting each data bit of information.

3. The method of claim 2 wherein said step of dividing said clock signal in response to said control signal comprises:
   a. producing a time integral of said control signal,
   b. comparing said time integral with a plurality of reference signals and producing comparison signals corresponding with each of said reference signals, each comparison signal being of a first state when said time integral is less than said reference signal and of a second state when said time integral exceeds said reference signal,
   c. selectively combining comparison signals to provide a coded word which represents the data rate setting, and
   d. utilizing said coded word to control the division of said clock signal into said timing pulses.

4. The method of claim 3 wherein the data rate setting may be changed by:
   a. varying from the surface of the earth an additional operating parameter of the logging-while-drilling system, and
   b. changing the state of at least one of said plurality of comparison signals in response to the change in said additional operating parameter, thereby changing the coded word representing the data rate setting.

5. A logging-while-drilling system for controlling from the surface of the earth the rate at which data derived from measured downhole conditions is transmitted from a downhole acoustic transmitter to the surface of the earth, comprising:
  a. means for varying from the surface of the earth the operating parameters of the logging-while-drilling system,
  b. means, located downhole, for detecting variations in said operating parameters and producing a first control signal for the period of time at least one of said operating parameters is within a predetermined range, and
  c. means responsive to said first control signal for providing timing pulses which set the data rate of the downhole acoustic transmitter, the timing pulses being representative of the period of said control signal, whereby the data rate setting is controlled from the surface of the earth by controlling the period of time said operating parameter is within a predetermined range.

6. The system of claim 5 wherein said means for providing timing pulses comprises:
  a. means for providing a time integral of said first control signal,
  b. a plurality of comparators for comparing said time integral with a plurality of reference signals, the output of said comparators being a plurality of comparison signals of a first state when said time integral is less than the reference signal to which it is compared and of a second state when said time integral exceeds the reference signal to which it is compared,
  c. means responsive to said comparison signals for producing a coded word defining the data rate setting of the acoustic transmitter,
  d. a source of clock pulses, and
  e. a programmable frequency divider which is programmed by said coded word to divide said clock pulses into the timing pulses required to set the data rate of the acoustic transmitter.

7. The system of claim 6 further including:
  a. means for producing a second control signal upon the variation of at least a second of said operating parameters, and
  b. means responsive to said second control signal for changing the binary state of at least one of said binary bits, whereby said programmable frequency divider is reprogrammed to produce the timing pulses required for a new data rate setting of the acoustic transmitter.

8. In a logging-while-drilling system employing a drill bit connected to a rotary drill string through which a drilling fluid is circulated by means of a surface pump, a plurality of transducers for measuring downhole conditions, and an acoustic transmitter for telemetering the information from the downhole location to the surface of the earth, the combination comprising:
  a. a surface-to-downhole communication channel,
  b. means located downhole in said communication channel for producing a first signal indicative of the condition of said communication channel,
  c. means located on the earth's surface for changing the condition in said communication channel,
  d. means located downhole for producing a pair of reference signals, said reference signals defining a predetermined range in the condition of said communication channel,
  e. means for comparing said first signal with the pair of reference signals for the communication channel and for providing a control signal during the period of time said first signal is within the predetermined range defined by said pair of reference signals,
  f. an integrator for providing a time integral of said control signal,
  g. means for providing a plurality of second reference signals,
  h. means for providing a plurality of comparison signals corresponding with said plurality of second reference signals, said comparison signals being of a first state when said time integral is less than the corresponding reference signal, and being of a second state when said time integral exceeds the corresponding reference signal,
  i. means responsive to said comparison signals for producing a plurality of complement signals, said complement signals being of the opposite state from the corresponding comparison signals,
  j. a source of clock pulses,
  k. a programmable frequency divider which divides said clock pulses into timing pulses, said divider being programmed by a selective combination of said comparison signals and said complement signals, whereby the frequency of said timing pulses is set from the surface of the earth by controlling the length of time that the condition within said communication channel is within the predetermined limits defined by said first reference signals, and
  l. means for applying said timing pulses to said acoustic transmitter, the frequency of said timing pulses defining the rate at which the acoustic transmitter transfers data derived from measured downhole conditions to the surface of the earth.

9. The system of claim 8 further including:
  a. at least a second surface-to-downhole communication channel,
  b. means located on the surface of the earth for changing the condition in said second communication channel,
  c. means located downhole and responsive to the condition in said second communication channel for producing a second control signal upon a change in said condition, and
  d. means responsive to said second control signal for changing the state of at least one of said comparison signals and said complement signals, whereby the frequency of said timing pulses, which frequency defines the data rate of said acoustic transmitter, may be changed from the surface of the earth by changing the condition in said second communication channel.

* * * * *

UNITED STATES PATENT OFFICE
CERTIFICATE OF CORRECTION

Patent No. 3,863,203  Dated January 28, 1975

Inventor(s) Bobbie J. Patton, James H. Sexton, and John W. Harrell

It is certified that error appears in the above-identified patent and that said Letters Patent are hereby corrected as shown below:

Column 1, line 12, "which" should be --within--.
Column 2, line 17, "pluarlity" should be --plurality--.
Column 3, line 44, "thorugh" should be --through--.
Column 4, line 21, "adn" should be --and--.
Column 5, lines 44 and 45, "This reverses the phase of the acoustic signal in motor 66." should be deleted.
Column 6, line 8, "increasng" should be --increasing--.
Column 9, line 41, "settting" should be --setting--.
Column 12, line 8, (in the table), "10 Instruments)" should be --Instruments)--.
line 51, before "comparison" insert --said--.

Signed and sealed this 22nd day of April 1975.

(SEAL)
Attest:

RUTH C. MASON
Attesting Officer

C. MARSHALL DANN
Commissioner of Patents
and Trademarks